Dec. 19, 1939.  B. G. CARLSON  2,183,932
AUTOMATIC TRIM CONTROL FOR AIRCRAFT
Original Filed May 29, 1937  3 Sheets-Sheet 1
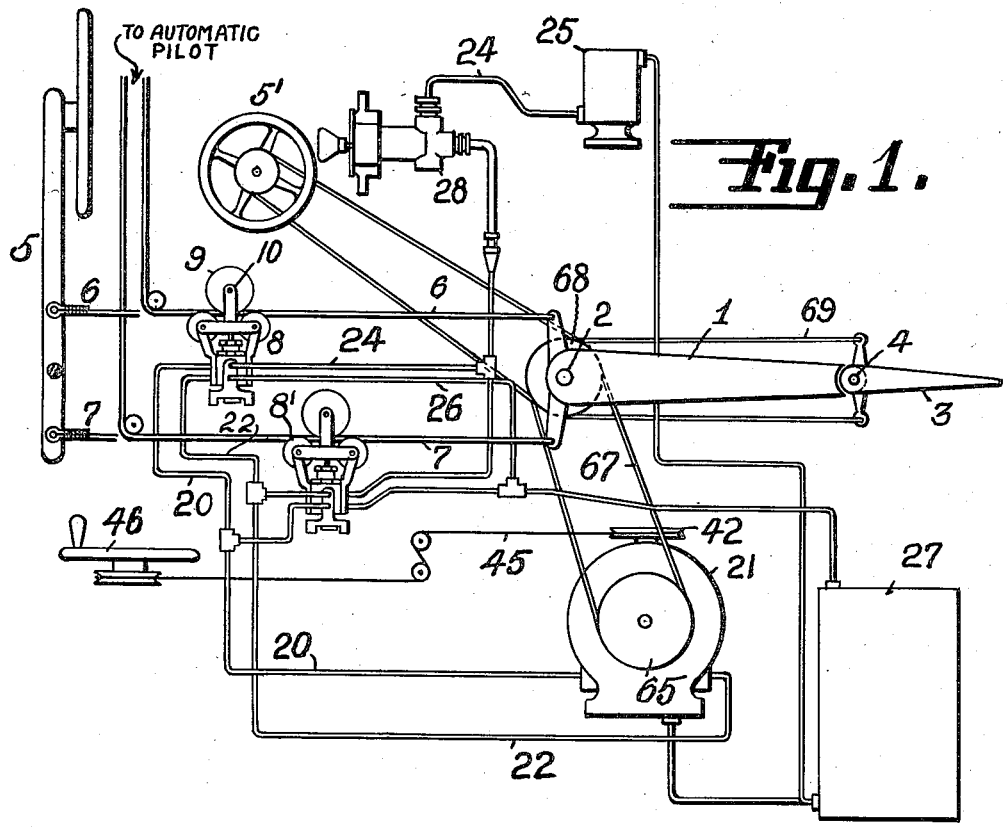
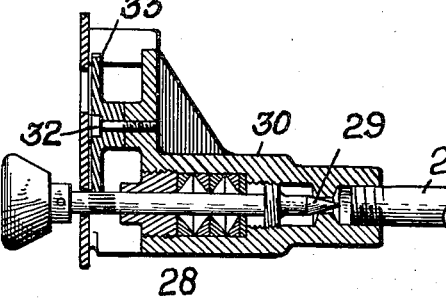
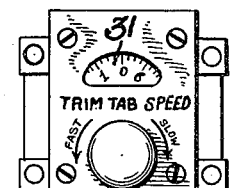
INVENTOR
Bert G. Carlson
BY
Herbert H. Thompson
HIS ATTORNEY

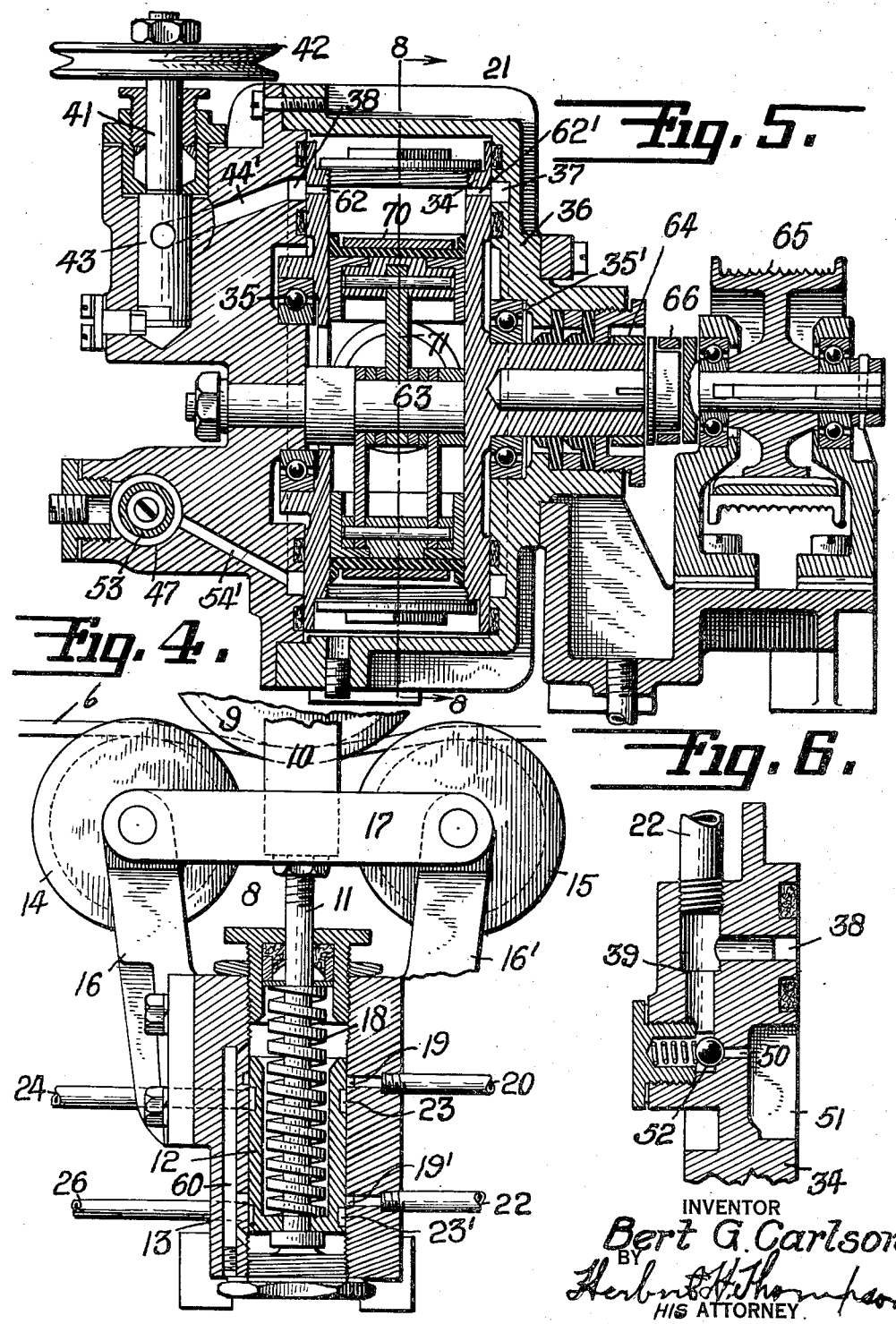

Dec. 19, 1939.  B. G. CARLSON  2,183,932
AUTOMATIC TRIM CONTROL FOR AIRCRAFT
Original Filed May 29, 1937   3 Sheets-Sheet 3

INVENTOR
Bert G. Carlson
BY
HIS ATTORNEY.

Patented Dec. 19, 1939

2,183,932

UNITED STATES PATENT OFFICE 2,183,932

AUTOMATIC TRIM CONTROL FOR AIRCRAFT

Bert G. Carlson, Freeport, N. Y., assignor to Sperry Gyroscope Company, Inc., Brooklyn, N. Y., a corporation of New York Application May 29, 1937, Serial No. 145,419
Renewed October 29, 1938

7 Claims. (Cl. 244—75)

This invention relates to the efficient operation of the control surfaces of aircraft, such as the elevator, ailerons or rudder, and more particularly, to the improved type of control surface which employs a trim tab or other Flettner arrangement. The invention has especial application to the control of the elevating plane, in which improper adjustment causes loss of flying speed and continuous strain on the interconnections between the main control surface and the actuating device, whether manual or the servo motor of an automatic pilot.

According to my invention, means are provided which are responsive to unequal strain in said interconnecting members for automatically turning the trim tab until the strain is equalized or eliminated.

Another feature of my invention is an improvement in hydraulic servo motors for actuating the trim tab or other control surface on airplanes, and in which a large overall movement may be obtained without the use of long cylinders.

Referring to the drawings, showing one form my invention may assume:

Fig. 1 is a diagram illustrating the general layout of my invention.

Fig. 2 is a face view of the knob for controlling the speed of actuation of the trim tab motor.

Fig. 3 is a vertical section of the same.

Fig. 4 is a vertical section of one of the strain responsive members or valves which control the hydraulic trim tab motor.

Fig. 5 is a vertical section of the preferred form of trim tab motor.

Fig. 6 is an enlarged sectional detail of an overflow valve for the crank case.

Figure 7:
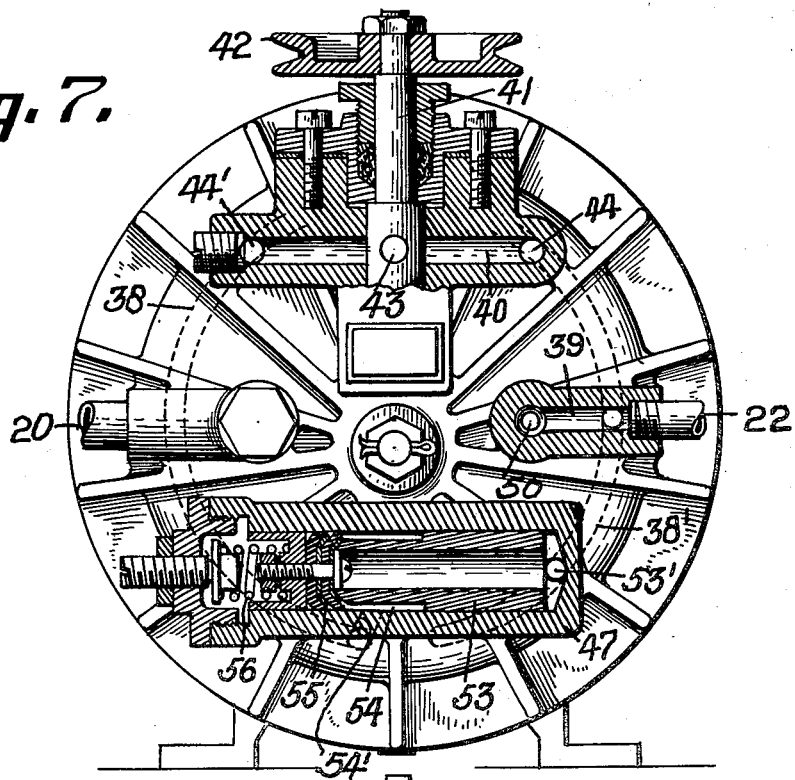
Fig. 7 is a front view, partly in section, of the motor.
Figure 8:
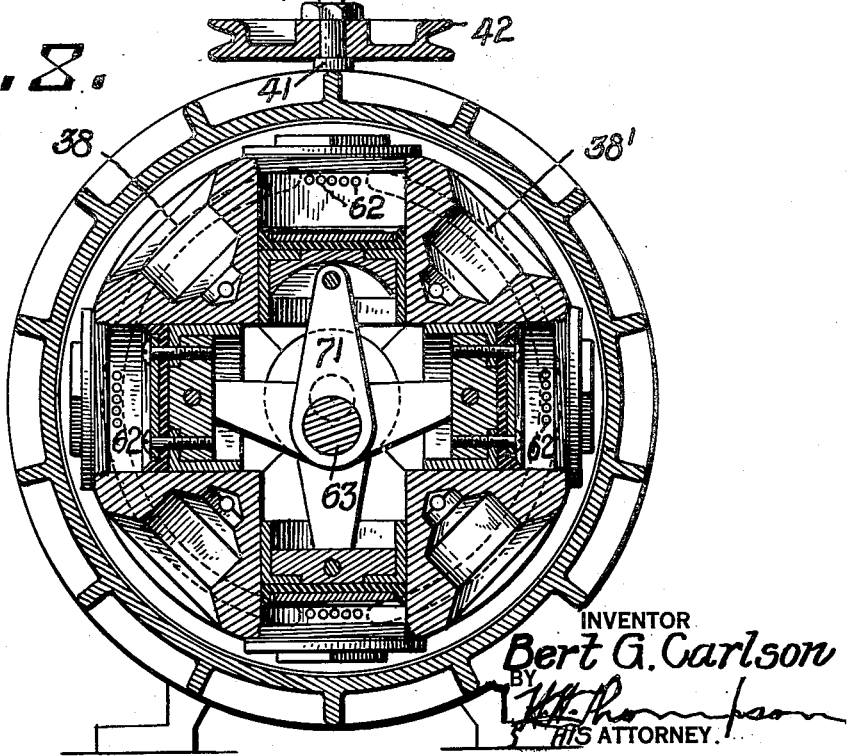
Fig. 8 is a vertical section of the same, taken approximately on line 8—8 of Fig. 5.

In Fig. 1, one of the main control surfaces or rudders, such as the elevator, is shown as of the articulated or trim tab type having a main surface or service rudder 1 pivoted at 2 to the tail of the craft and a trim tab or auxiliary rudder 3 pivoted on the main surface at 4. The main surface may be ordinarily controlled by any suitable device, such as by the operating lever 5 or from the servo motor of an automatic pilot (not shown), or both, there being connecting cables 6 and 7 connecting the actuating device and the control surface proper. The trim tab is shown as adjusted either manually from control member 5' or automatically from servo motor 21.

Threaded on each of said cables 6 and 7, I show a control valve arrangement 8, which may be in the form of a multiple pulley block having an upper pulley 9 rotatably mounted in a fork 10 on a vertically slidable stem 11 secured to a piston 12 in hydraulic cylinder 13. The two outer pulleys 14 and 15 are shown as rigidly secured to the cylinder 13 through suitable brackets 16 and 16' and cross bars 17. Preferably, the lower portion of the central pulley is resiliently held below the upper portion of the pulleys 14 and 15 as by means of coil spring 18 within the cylinder, thus ordinarily maintaining a curve or slack in the cables 6 and 7. In case, however, of a continuing tension in a cable of predetermined magnitude, the piston 12 connected to that cable will be moved upwardly against the spring.

The cylinder is shown as having a pair of circular recesses 19 and 19' in the inner walls thereof, the former being connected to pipe 20 leading to one side of the rotary servo motor 21, and the other pipe 22 leading to the other side of the servo motor. The piston is likewise provided with a pair of annular grooves 23 and 23', the former connected with a port in communication with pipe 24, connected to the pressure pump 25, and the latter with pipe 26 which leads back to the sump 27. A bypass channel 60 is shown connecting the two ends of the cylinder 13 to bypass oil or air around the piston when it moves. With the piston in the position shown in Fig. 4, all ports are closed and the servo motor idle. In case, however, the piston 12 of the members 8 is moved upwardly by the tension of the wire, the pump pressure passes from pipe 24 to pipe 20 through the communicating ports 19 and 23, and at the same time a return connection is provided to the sump through ports 19' and 23' and through pipes 22 and 26. From the connections shown in Fig. 1, it will be apparent that the control members 8 and 8' are reversely connected to the servo motor 21 so as to drive the same in opposite directions, so that when the tension in cable 6 is materially greater than in 7, the servo motor 21 is driven in a direction to turn the tab to equalize such pressure, i. e., to reduce the pressure in 6 and increase it in 7, and vice versa.

Preferably, there is interposed in the pipe line 24 between the pump 25 and the control members a regulating valve 28 to regulate the rate of flow in the oil system and, hence, the trim tab speed. This is shown as in the form of a needle valve 29, the stem of which is threaded in the valve housing 30. Preferably an indicator is provided to indicate the speed of flow set, this being shown as a graduated dial 31 rotatably mounted on pin 32 and having teeth 33 engaging small teeth on the stem 29. By the use of some such time lag device, motor 21 is made responsive only to continued unbalanced pressure or pull of the service rudder on the control means 5 therefor.

The servo motor is shown as in the form of a multi-cylinder rotary hydraulic engine, the cylinder block 34 being rotatably mounted in anti-friction bearings 35, 35' within the stationary housing 36. Said housing has two pairs of inwardly facing substantially semicircular ports or grooves 37, 37' and 38, 38'. The tops of the cylinder blocks each have a plurality of small ports 62, 62' bored therethrough on both sides in line with ports 37, 38, 37' and 38'. The diametrically opposite pistons 70 are placed 180° apart and the piston rods 71 all engage the common stationary crank shaft 63 which is placed off center with respect to the bearings 35, 35' and the rotary extension 64 of the housing which drives the pulleys 65 through universal coupling 66. A cable 67 is shown as connecting said pulley with a second pulley 68 concentric with axis 2, from which another cable 69 leads to the trim tab 3. Port 38 is normally connected to one pipe 20 and the other port 38' to pipe 22. Said pipes are shown as entering the engine from opposite sides in Fig. 7, the pipes leading into short radial channels 39, one of which is connected to 38 and the other to 38'. It will readily be apparent, therefore, that as each cylinder passes the intake port, it will be forced outwardly under the oil pressure and as it passes the outlet side, the oil will be ejected therefrom. With my improved construction, the abutting walls of the revolving cylinder block and the housing adjacent the annular ports 37, 38 are effectively lubricated by the oil under pressure passing into and out of the engine, which pressure is maintained equal on both sides of the cylinder block. Each of said channels 38, 38' is also in communication with a bypass channel 40 through cross ports 44 and 44', which channel is normally closed by rotary valve 43, but which may be opened by rotating the attached pulley 42 to place the transverse port, through the valve stem 43, in line with the passage 40. The pulley may be manually controlled from a distance through a wire 45 and handwheel 46.

Each passage 39 is also shown as having a normally closed connection 50 to a chamber 51 in communication with the crank case of the engine. The passage 50 is shown as normally closed by a spring pressed ball 52, but in case the pressure in the crank case builds up beyond that in the return side of the line, the ball is lifted from its seat and the oil flows back into the sump. Such a relief valve is employed in each passage so that one valve will always remain operative regardless of the direction in which the engine is being run.

A safety bypass arrangement is also provided so that the servo motor may be over-controlled manually if desired or necessary. This is shown as in the form of a cylinder 47 in communication with both of channels 38 and 38', one of said channels 38' leading within a hollow piston 53 at 53' and the other, 38, connected at 54' to a channel 54 around the reduced end of said piston. Seated on the end of said piston is a piston valve 55 extending across the cylinder walls and held in place by a stiff spring 56, this valve being designed on the same principle as that covered in my prior Patent No. 2,069,214, dated February 2, 1937, for Safety device for airplane pilots. Therefore, whenever the pressure in either side of the line rises above a predetermined value, the valve opens and allows the oil to bypass from one side of the line to the other, thus permitting direct manual control and avoiding the locking of the system.

From the foregoing, the operation of my invention will be readily apparent. Persisting excess tension of either cable 6 or 7 will cause readjustment of the trim tab by the proper actuation of the servo motor 21 from the control valve 8 or 8', which is moved by the tension in the cable. In case both cables 6 and 7 are placed under continuing tension, both valves 8 and 8' would be lifted, which will not drive the motor 21 in either direction, but will permit ready manual adjustment through hand wheel 5', since under those circumstances the oil is bypassed through the two valves 8 and 8', which are both open. In case of failure or faulty operation of the servo motor, it may be either bypassed manually by turning crank 46, or else over-controlled from handwheel 5 either by reason of the safety valve 55 or by reason of both valves 8 and 8' being open at the time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a control device for aircraft, the combination with a main and an auxiliary or trim control surface, primary means for moving said main surface, auxiliary servo-motive means for moving said trim surface, and means responsive to an unbalanced force acting between said main surface and its actuating means for causing actuation of said servo means to readjust said trim surface to eliminate said force.

2. A control device for aircraft as claimed in claim 1, in which said primary means is connected to said main surface through cables, the relative tension of which constitutes the motivating unbalanced force causing actuation of said servo means to readjust the trim surface.

3. In a control device for aircraft, the combination with a main and an auxiliary or trim control surface, primary means for moving said main surface, auxiliary servo-motive means for moving said trim surface, strain members connecting said surface and said means, and means responsive to an unbalanced strain in said members for causing actuation of said servo means to readjust said trim surface to eliminate said strain.

4. In a control device for aircraft, the combination with a service and an auxiliary trim rudder and a controller for the former, means for connecting the controller and said service rudder to steer the craft, a servo motor for operating the trim rudder, and means responsive to continuing unbalanced pressure from said service rudder on said connecting means for controlling said servo motor to readjust the latter to relieve said pressure.

5. In a control device for aircraft, the combination with a service and an auxiliary trim rudder and a controller for the former, means for connecting the controller and said service rudder to steer the craft, a servo motor for operating the trim rudder, means responsive to unbalanced pressure from said service rudder on said connecting means for controlling said servo motor, and means for delaying the actuation of said servo motor, whereby it is only affected by continuing out of balance pressure.

6. In a control device for aircraft, the combination with a main and an auxiliary or trim control surface, primary means for moving said main surface, auxiliary hydraulic servo-motive means for moving said trim surface, a cable connecting said primary means and main surface, and means connected to said cable responsive to increase of tension therein for supplying fluid under pressure to operate said servo motor.

7 An automatic trim regulator as claimed in claim 6, having an adjustable speed valve in the fluid pressure line to regulate the rate of movement of the trim surface.

BERT G. CARLSON.